United States Patent [19]
Goshima et al.

[11] 3,994,582
[45] Nov. 30, 1976

[54] ORIGINAL KEEP DEVICE IN COPYING MACHINE

[75] Inventors: Yoshitomo Goshima, Yokohama; Hiroyuki Hattori, Mitaka; Shiro Komaba, Kawasaki; Kazumi Umezawa, Yokohama, all of Japan

[73] Assignee: Canon Kabushiki Kaisha, Tokyo, Japan

[22] Filed: Oct. 3, 1974

[21] Appl. No.: 511,755

[30] Foreign Application Priority Data
Oct. 5, 1973 Japan.............................. 48-112636
Dec. 6, 1973 Japan........................ 48-141534[U]

[52] U.S. Cl. ................................................. 355/75
[51] Int. Cl.² ........................................ G03B 27/62
[58] Field of Search ............... 355/72, 75, 113, 118, 355/74, 76

[56] References Cited
UNITED STATES PATENTS
1,148,554   8/1915   Vanderburg........................... 355/74
2,774,289   12/1956  Collins............................ 355/113 X
2,799,204   7/1957   Blatherwick.......................... 355/76
3,642,371   2/1972   Jones et al......................... 355/82 X
3,682,547   8/1972   Ratowsky............................. 355/74
3,717,411   2/1973   Niesen et al........................ 355/75
3,829,211   8/1974   Mitchell............................. 355/74

*Primary Examiner*—Richard A. Wintercorn
*Attorney, Agent, or Firm*—Fitzpatrick, Cella, Harper & Scinto

[57] ABSTRACT

In a copying machine, an original keep device comprises a mechanism which includes at least one expansible member and two or more support members, the mechanism having rotatable coupling points and at least one movable coupling portion, and an original keep member for holding down an original. The keep member is held by one of said support members of the mechanism. The original keep member may be held in open position above the original by the force of the expansible member.

8 Claims, 22 Drawing Figures

ORIGINAL KEEP DEVICE IN COPYING MACHINE

BACKGROUND OF THE INVENTION

1. Field of the Invention

This invention relates to an orginal keep device for the original carriage of copying machine.

2. Description of the Prior Art

Original keep devices according to the prior art are illustrated in FIGS. 1 to 3 of the accompanying drawings. FIG. 1 shows a copying machine provided with an original keep device of the prior art.

On top of the machine housing 1, a movable original carriage 3 may be guided along rails 7 and 7'. To produce a copy, an original keep plate 4 of flexibility formed of rubber or similar material which is disposed on top of the original carriage 3 may be raised or opened (as indicated by dots-and-dash lines in FIG. 1) by manually gripping a handle 8 thereof, whereafter an original may be placed in position beneath the keep plate with its image-bearing surface facing down and then the original keep plate 4 may be lowered or shut to its initial position, whereafter a copy button 5 may be depressed. The original carriage 3 will automatically reciprocate horizontally and a copy will be discharged onto a tray 6.

The original keep plate 4 has one end thereof secured to the original carriage 3 by means of hinges 2 and 2'. Such an original keep device is very simple in construction and requires only a few parts and thus a lower cost. This system, however, requires the operator to grip and raise the original keep plate with his right hand while placing an original with his left hand. Thus, the operator has to use his both hands for copying a single original, and when a plurality of different originals are to be copied in succession, only one of them must be taken and the other originals must be placed somewhere else. This means a low operability of the device to the user. In spite of such disadvantage, the simplicity of construction has contributed to employment of such system.

FIGS. 2 to 4 show a second example of the conventional device. Again, on top of the machine housing 1, a movable original carriage 3 may be guided along rails 7 and 7'. To produce a copy, an original keep plate 4 may be raised or opened by manually gripping a handle 8 thereof, an original to be copied may be placed on the carriage, the original keep plate may be lowered or shut and a copy button 5 may be depressed. The original carriage 3 will automatically reciprocate and a copy will be discharged onto a tray 6. The original keep plate 4 has one end thereof secured to the original carriage 4 by means of hinge 2. A block 10 is secured to the original keep plate 4 and formed with a hole $10_3$ in which one end of a support bar 9 is fitted. The other end of the support bar 9 is loosely fitted in a hole formed in the handle 8. When the original keep plate is opened beyond 90° by gripping the handle 8, the keep plate tends to fall down from gravity in the opposite direction, but the back $10_1$ of the block 10 bears against the upper surface of the original carriage 3 to prevent any further pivoting of the original keep plate, while the support bar 9 has its counter-clockwise swing restricted with respect to the block 10 (the restriction is provided by the engagement between the support bar 9 and the bearing surface $10_2$ of the block 10)l, so that the original keep plate may remain open even after the handle is released. Why the support bar 9 is designed for some swinging movement with respect to the block 10 will be apparent from FIG. 4. More particularly, the reason is that even if a greatly thick original such as original 0 is placed on the carriage 3, the line passing through the hinge 2 and the block hole $10_3$ and the line of the support bar 9 form a wide angle to allow for reception of even such thick original.

This system is good in operability inasmuch as the keep plate 4 can remain open to leave the other hand of the user free. Such system has been employed in larger-sized copying machines.

Although not so popular, there is a third system whereby the original keep device is operatively associated with the copy button. This is an automatic system wherein depression of the copy button closes the keep plate and completion of a copy causes the keep plate to be opened. Such system involves complicated mechanical construction and has only been employed in a few of high-class copying machines.

These three systems are all of the original keep devices for copying machines, although they involve some differences in details when they are embodied. Except the third one, the first and second systems would offer problems if they were applied to large-sized copying machines because the original keep device would accordingly be larger in size and heavier in weight.

First, in case of the first system, the original keep plate would be too large and heavy to handle and hold it with a single hand, and in case of the second system, access to the keep plate when in its open position would be impossible.

Also, in the copying machines of the prior art, the original keep plate must be opened and shut for each copying operation irrespective of the size of the original to be copied, to thereby permit the original to be placed on and removed from the original carriage. In such instances, no problem in operation would be encountered in copying machines of smaller maximum copy size because the original keep device would correspondingly be smaller in size, but if the copying machines were of larger maximum copy size (say, A2 or larger size), then the original keep device would become larger and heavier and thus, would be difficult to manipulate. More specifically, the original keep plate in its open position would be difficult to manually hold and placement of the original in position on the carriage would also encounter difficulties. Further, the entire keep plate of heavy weight must be opened and shut for each copying operation irrespective of the copy size and this means an increased labor and accordingly a problem in operability of the machine on the part of the operator.

FIGS. 21a and b show the relationships of the copy sizes (areas) of formats A and B less than A2. In format A (FIG. 21a), A4 is the double size for A5, A3 is the double size for A4, and A2 is the double size for A3. In format B (FIG. 21b), B4 is the double size for B5 and B3 is the double size for B4. Thus, if the maximum copy size for the copying machine is size A2, an original of size A2 or B3 could not be set on the original carriage unless the entire original keep plate is opened, but by designing the original keep plate into a split construction so as to permit a portion thereof somewhat larger than one-half of the entire area of the keep plate to be opened and shut, originals of lesser size, i.e. A3, A4, A5, B4, B5, etc. may be set on the original carriage without the need to open the entire keep plate.

SUMMARY OF THE INVENTION

It is an object of the present invention to improve the operability with which an original to be copied is placed on or removed from the original carriage of copying machine.

That is, it is an object of the present invention to provide an original keep device which can hold an original keep plate in a suitable position by means of a linkage mechanism.

It is another object of the present invention to provide an original keep device which can hold a thin original as well as a thick original with a uniform pressure force.

It is still another object of the present invention to provide an original keep device which is movable vertically substantially in parallel to the original carriage.

It is yet still another object of the present invention to provide an original keep device in which the original keep plate can be opened and shut in accordance with the size of the original to be copied.

Thus, the present invention improves the operability of the original keep device with which an original to be copied may be placed on or removed from the original carriage of copying machine and this is accomplished by holding the original keep plate on a base, which is vertically movable in horizontal position, by means of a linkage mechanism, and using a spring to offset the weight of the keep plate and permitting the keep plate to be held open at an angle less than 90°.

According to the present invention, as described, the original keep plate when shut urges an original with its own weight and, when opened, gradually decreases its weight to open at an angle less than 90° and is held in a position to permit ready access to the handle thereof. This contributes to great improvement of the operability and is particularly effective for application to large-sized copying machines.

In addition to the fact that the entire original keep plate can be opened and shut with respect to the original carriage to provide improved operability of the keep plate, a portion of the keep plate can also be opened and shut to permit smaller sizes of originals to be placed on and removed from the original carriage, thus eliminating the need to open or shut the entire keep plate in case of these smaller originals.

The invention will become more fully apparent from the following detailed description thereof taken in conjunction with the accompanying drawings.

DESCRIPTION OF THE PREFERRED EMBODIMENTS

Figure 1:
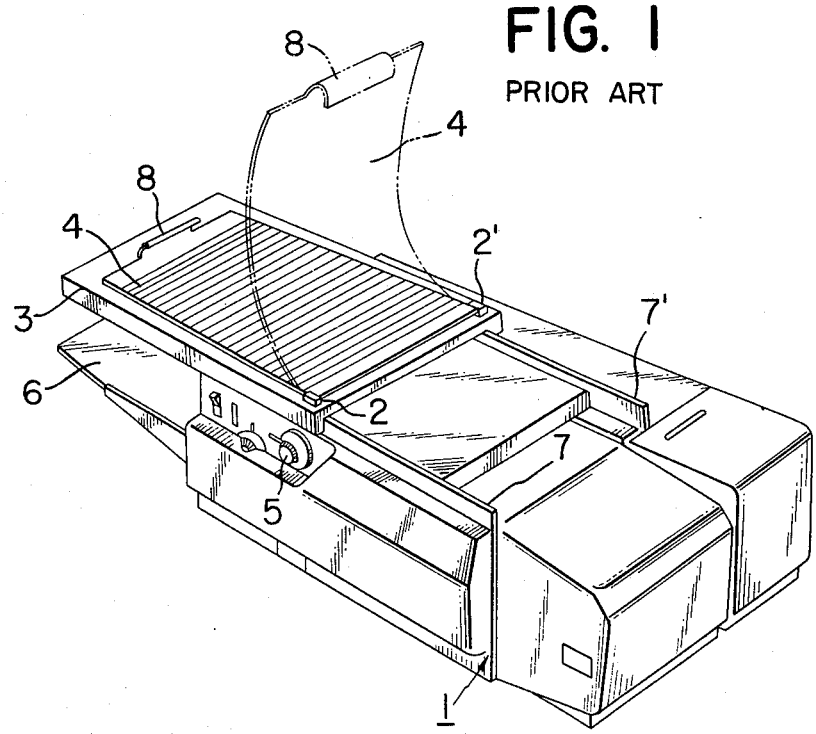
FIGS. 1 and 2 are perspective views of the prior art copying machines.
Figure 2:
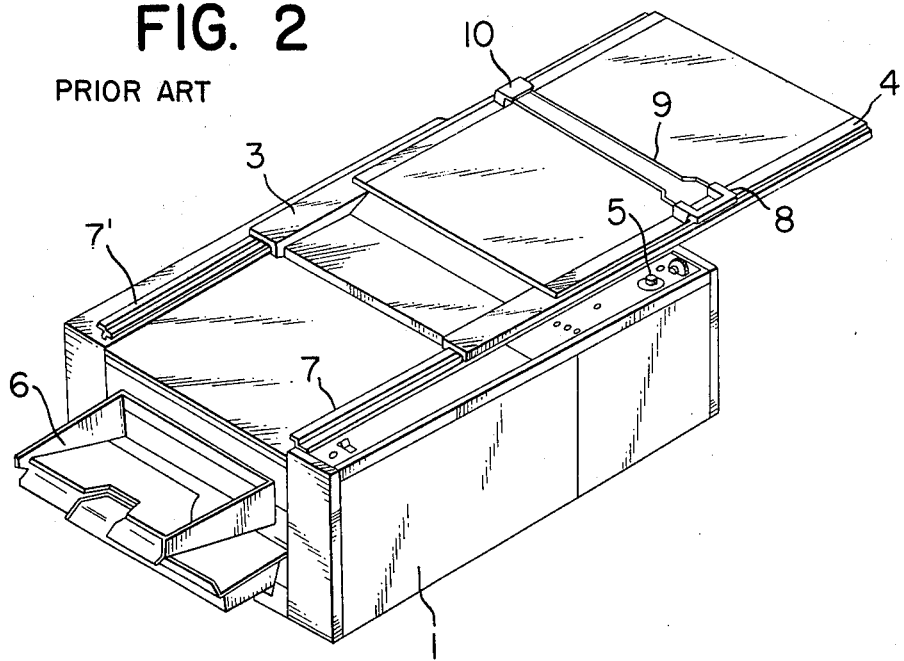
Figure 3:
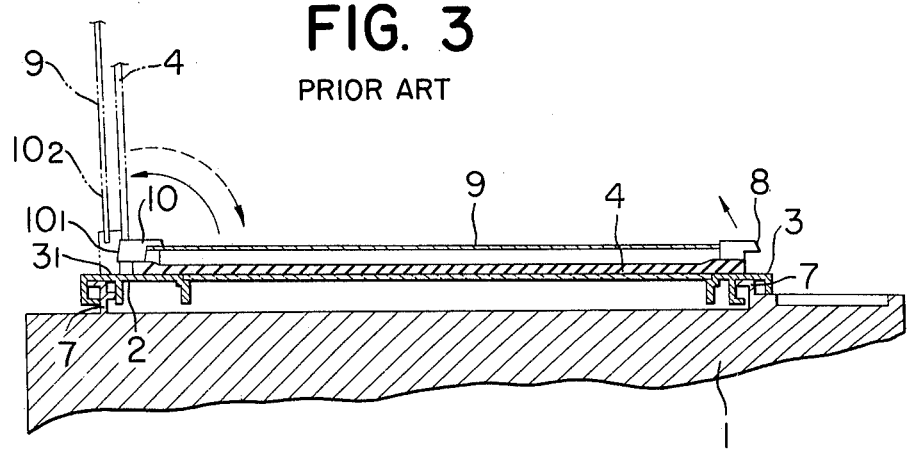
FIGS. 3 and 4 are longitudinal sections of the original keep devices in the prior art copying machines.
Figure 4:
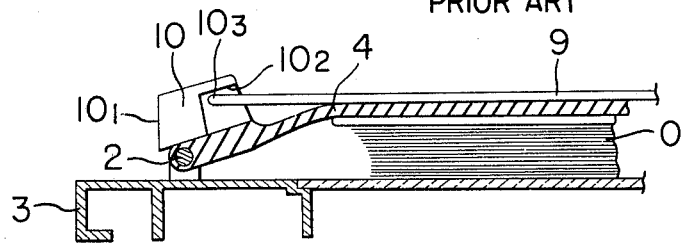
Figure 5:
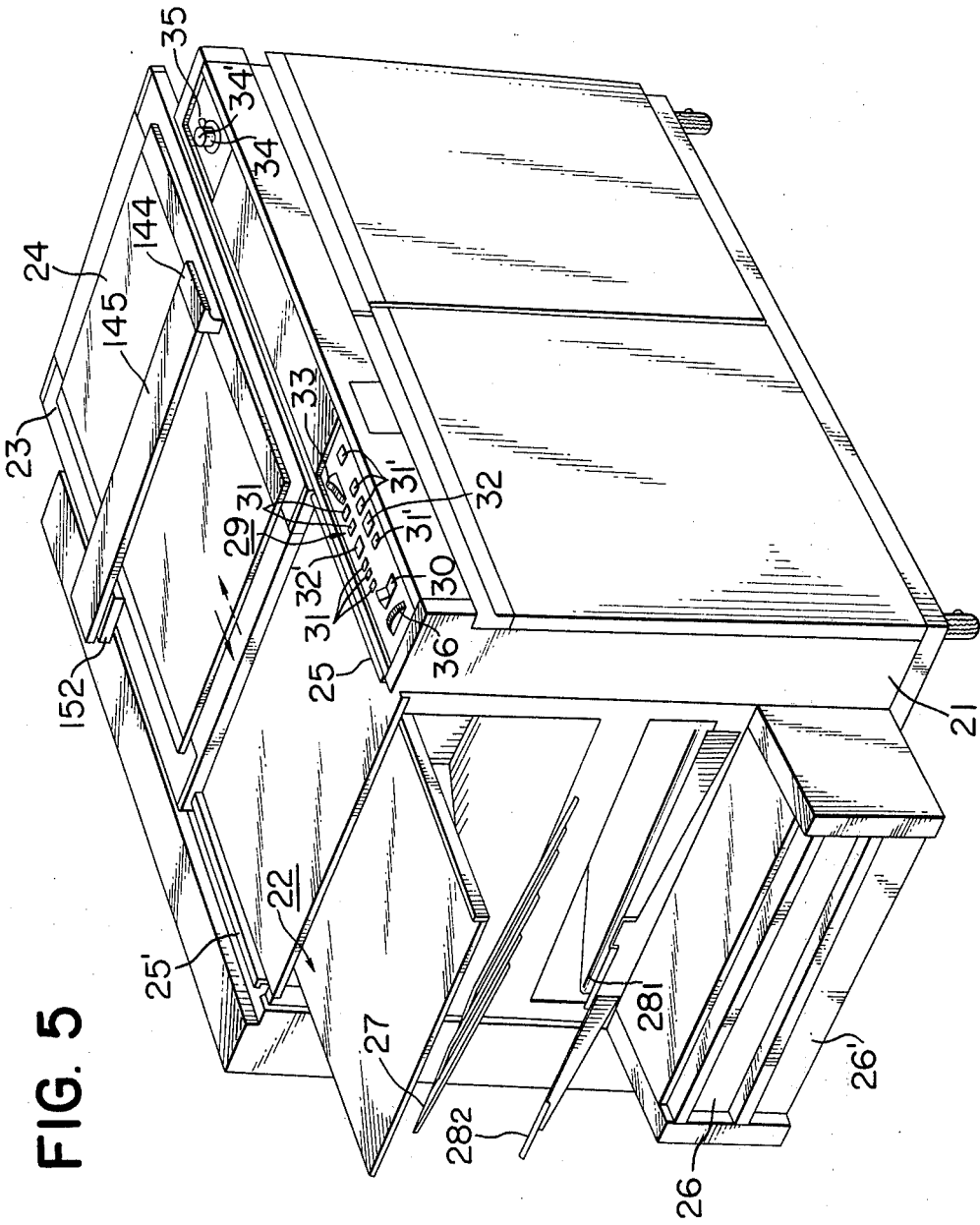
FIG. 5 is a perspective view of the copying machine having the original keep device of the present invention.

Description will first be made of a copying machine to which the present invention is applicable. FIG. 5 shows a special copying machine which can produce copies of up to size A2 (sometimes larger sizes) and which, for copying, permits a sheet original to be inserted through a sheet original inlet port and permits a thick original to be placed on an original carriage. The original carriage 23 is on top of the machine housing 21 and a keep plate 24 of rubber or like material is designed to hold down an original. The keep plate 24 may be opened by gripping a handle 144 to place thereon an original, and then the keep plate may be shut and copy button 34' may be depressed, whereby the original carriage will automatically reciprocate and a copy will be discharged onto a tray 28. In FIG. 5, reference numeral 22 designates a sheet original transport portion, and the carriage 23 is for carrying thereon a thick original (hereinafter referred to as "book original") and normally covered with the original keep plate 24. The copying machine further includes original guide rails 25 25', and upper and lower paper feeder beds 26 and 26' for containing therein different sizes of transfer paper P, respectively. The machine also includes auxiliary trays $28_1$ and $28_2$, an operating portion 29, a main switch 30, a group of indicator lamps $31_1$–$31_6$, a selector switch 32 for selecting the upper one of the two paper feeder beds, a change-over lever 33 for effecting change-over between sheet original copying mode and book original copying mode, a selector knob and copy button 34 for selecting the number of copies to be continuously produced during book original copying mode, an emergency stop button 35 operable during continuous copying of book original, and a throttle dial 36 for adjusting the copying speed.

An embodiment of the present invention will now be described.

Figure 9:
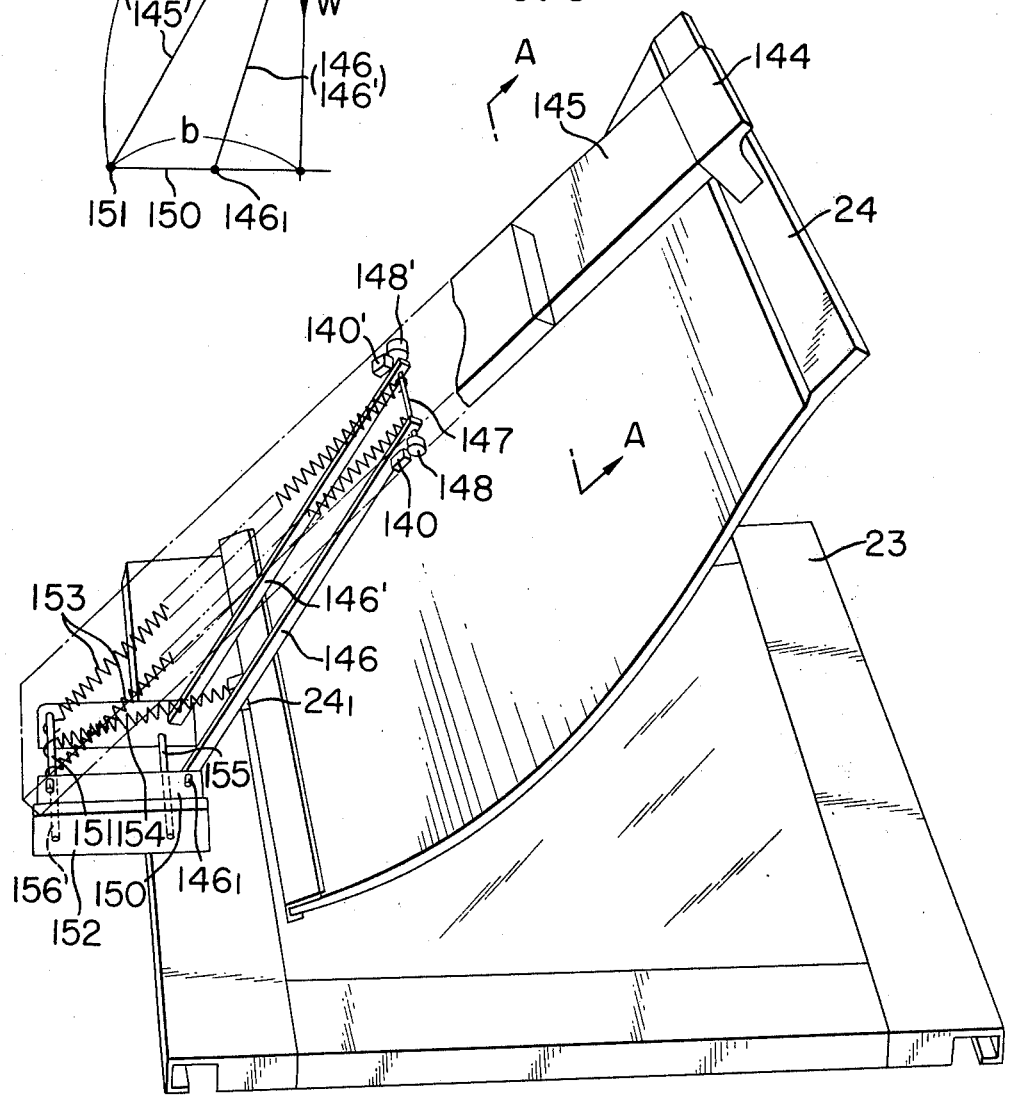
FIG. 9 is a perspective view of the keep device of the present invention.
Figure 11:
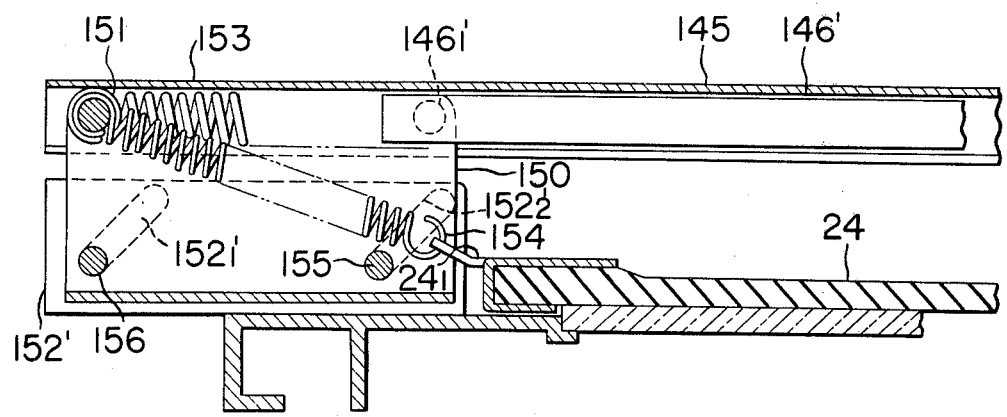
Figure 12:
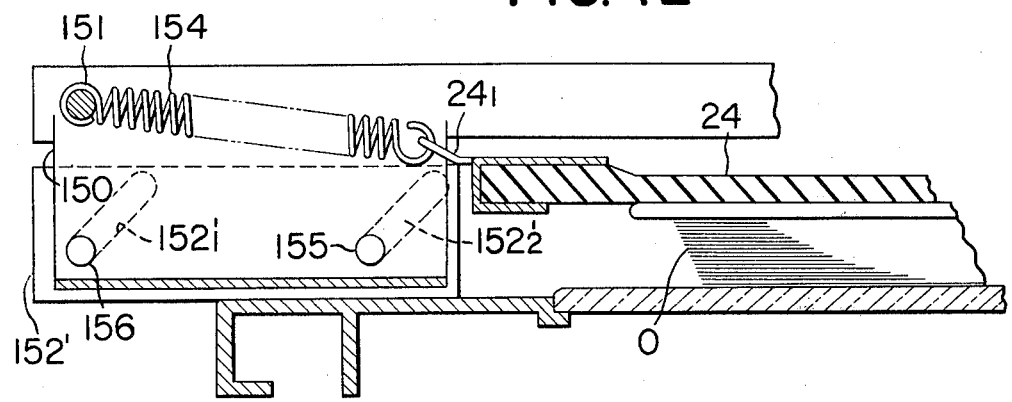

FIG. 9 is a perspective view of an original carriage and a keep plate. FIGS. 6, 7, 11, 12 and 13 are cross-sectional views thereof.

The original keep plate 24 has a handle 144 secured to one end thereof, and the handle 144 is further secured to a support arm 145. The support arm 145 is rotatable about a shaft 151 and mounted on a bed 150 so as to permit the original keep plate 24 to be opened and shut. Support bars 146 and 146' are further mounted on the bed 150 for rotation about pins $146_1$ and $146'_1$. A shaft 147 extends through the support bars 146 and 146' at their othere ends, and rollers 148 and 148' are mounted on the opposite ends of the shaft 147. These rollers are rollable in grooves formed in the support arm 145.

Springs 153 extend between and are secured to the shafts 147 and 151 to bias the support arm 145 upwardly.

Stops 140 and 140' are secured to the support arm 145 so as to limit the movement of the rollers 148 and 148' when the shaft 147 is pulled on by the springs 153.

Figure 7:
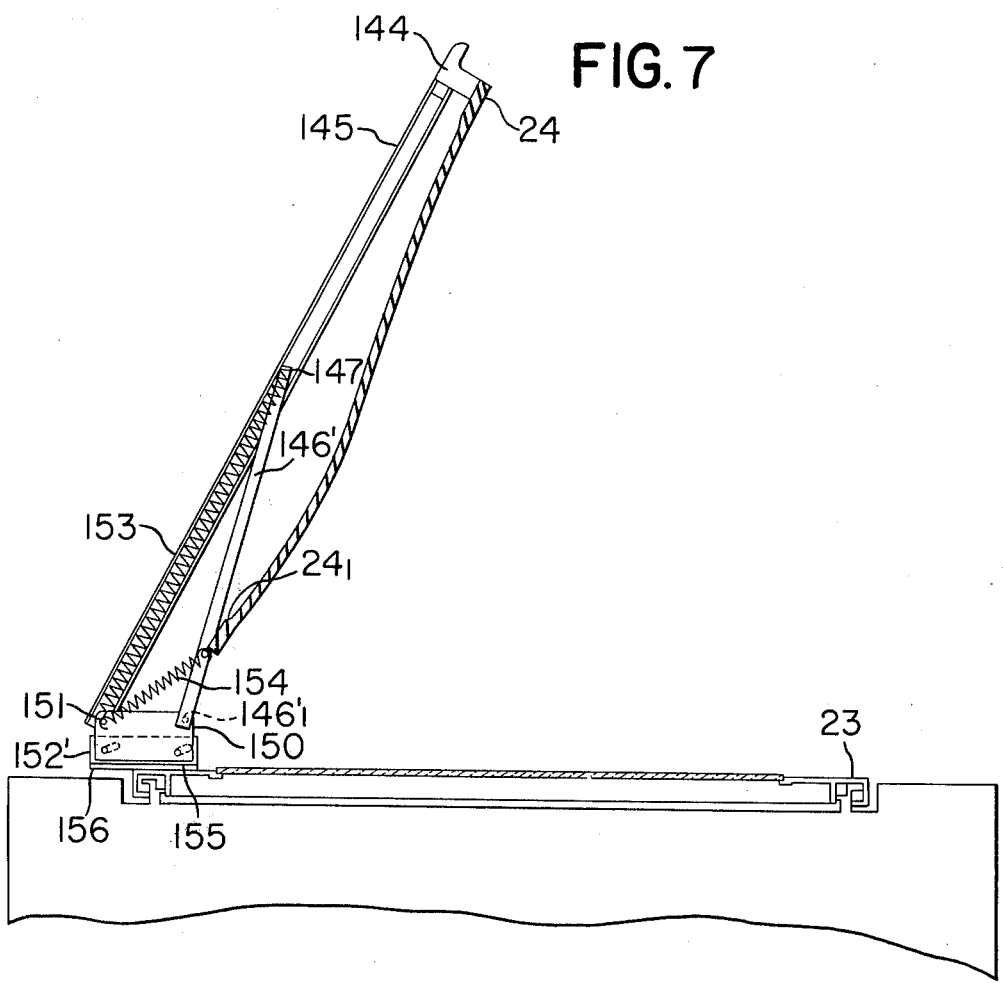
Figure 13:
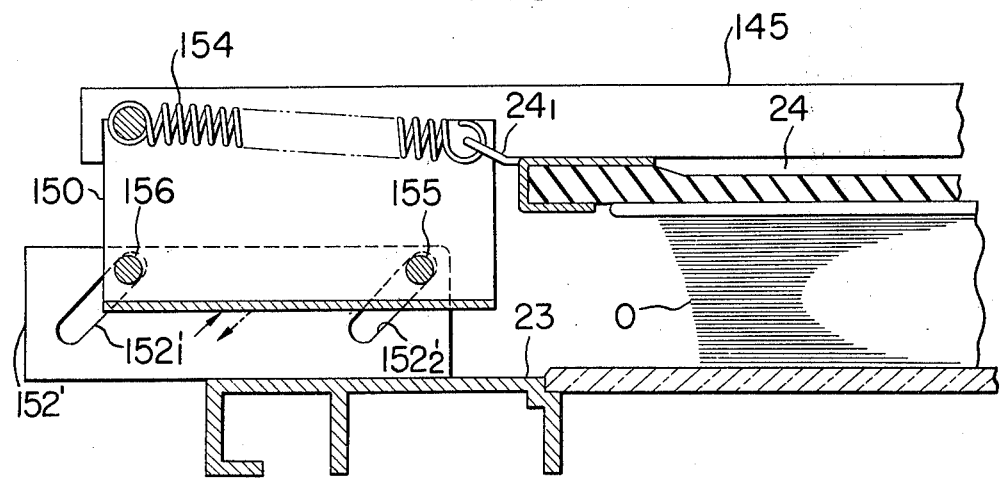

A spring 154 is secured to the rear end $24_1$ of the keep plate 24 to connect the keep plate to the shaft 151. This spring, as seen in FIGS. 7 and 9, pulls on the rear end of the keep plate when opened, to thereby prevent the keep plate from interfering with placement of an original. Also, as shown in FIG. 13, the keep plate equally performs its function as such for thick original 0.

Figure 8:
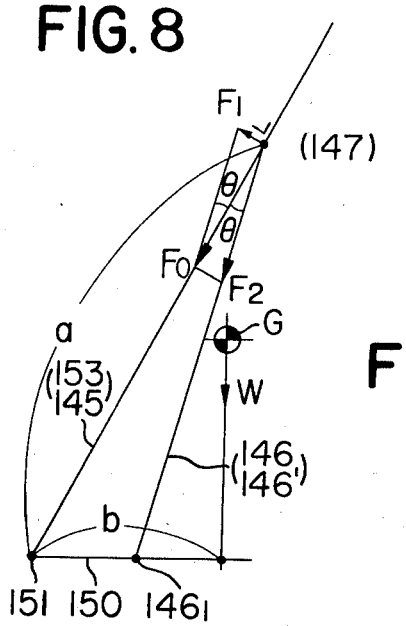
FIGS. 8, 14, 15, 16, and 17 are views for illustrating the present invention.
Figure 10:
FIG. 10 is a cross-section taken along line A—A in FIG. 9.

As shown in FIG. 8, the force with which the support arm tends to open in counter-clockwise direction results from a component $F_1$ of the force $F_0$ of the spring 153 which is perpendicular to the support arm, and the moment M with which the support arm tends to open may be expressed:

$$M_0 = a \cdot F_0 \tan\theta \qquad (1)$$

where $a$ is the distance between the shafts 151 and 147, and $\theta$ is the angle between the support arms 145 and 146. On the other hand, the moment $M_C$ with which the support arm tends to shut may be expressed:

$$M_C = W \cdot b \qquad (2)$$

where $C$ is the center of gravity of the keep plate, $W$ is the weight of the keep plate, and $b$ is the length of the arm to the center of gravity.

$M_O$ is greater than $M_C$ immediately before the rollers 148,148′ strikes the stops 149,149′, but when the rollers strike the stops, $F_0$ is partly reduced by the stops to establish the relation that $M_O = M_C$, whereby the support arm may be maintained in open position. A component of force $F_2$ is supported by the support arms 146,146′.

Figure 6:
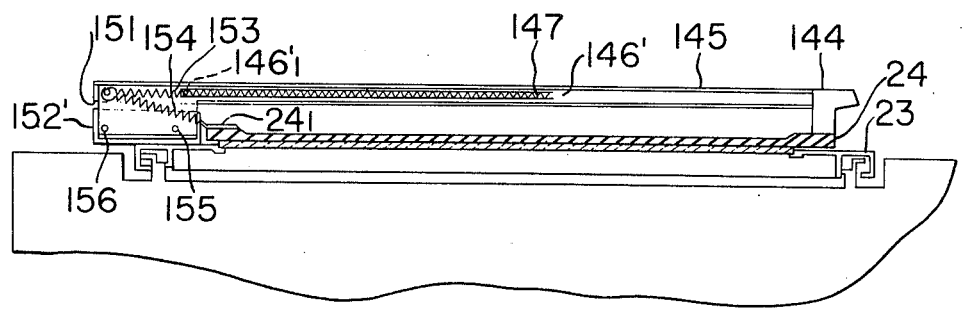
FIGS. 6, 7, 11, 12 and 13 are longitudinal sections showing an embodiment of the original keep device according to the present invention.

As will be seen from equation (1), when the keep plate has been shut as shown in FIG. 6, $\theta = 0$ and thus there is acting no force which will attempt to open the keep plate. As a result, the original carried on the original carriage may be sufficiently held down by the weight of the keep plate 24.

Two shafts 155 and 156 extend through the bed 150 and their ends are fitted in two oblique grooves provided in a pair of blocks 152 and 152′ (i.e. grooves $152_1, 152_2$ in the block 152 and grooves $152′_1, 152′_2$ in the block 152′). Such arrangement of the two shafts and oblique grooves adapts the present device well for its purpose by permitting the bed 150 to slide upwardly even when the original is so thick that the keep plate 24 bears against the support arm 145 (see FIG. 13).

The present invention increases its usefulness by the combination thereof with the upwardly slidable bed.

As is apparent from the foregoing description, the weight of the keep plate when in its open position is supported by a cantilever which comprises a linkage having one end pivoted to the bed 150 and including the members 145, 150, 146 and 146′. Thus, a moment acts on the bed 150. Therefore, the bed 150 must be locked against rotation.

Thus, the bed 150 must unavoidably be designed for parallel movement. In the present embodiment, this is realized by a very simple arrangement of pins and grooves, whereas it will be apparent that it may also be realized by a linkage in the form of parallelogram or pantagraph.

Figure 15:
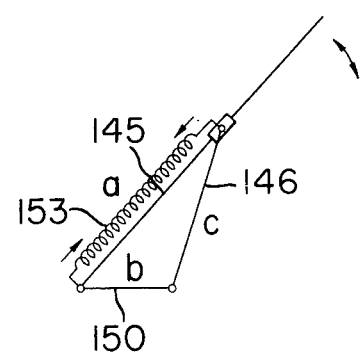

The present invention may be diagrammatically expressed as in FIG. 15.

In this figure, it will be noted that the spring and links together form a triangle, and thus the following relationships will be seen:

In shut position of the keep plate, $a = b + c$, and

In open position of the keep plate, $a < b + c$ ($a$ shrinks).

Figure 14:
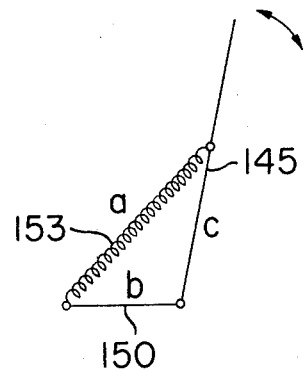
Figure 16:
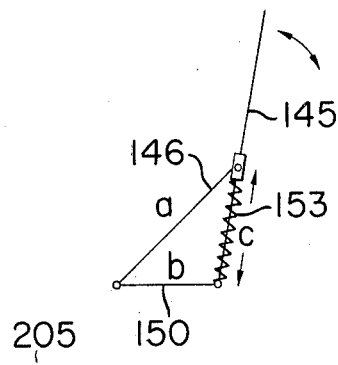
Figure 17:
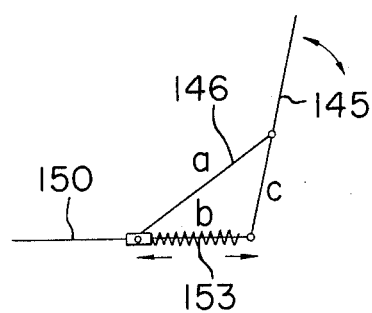

From this, it will be clear that alternative arrangements as shown in FIGS. 16 and 17 are possible wherein side $b$ or side $c$ is stretched by a spring. Further, it will also be possible to modify the arrangement of FIG. 15 into the form as shown in FIG. 14 wherein the support member 145 is omitted.

Figure 20:
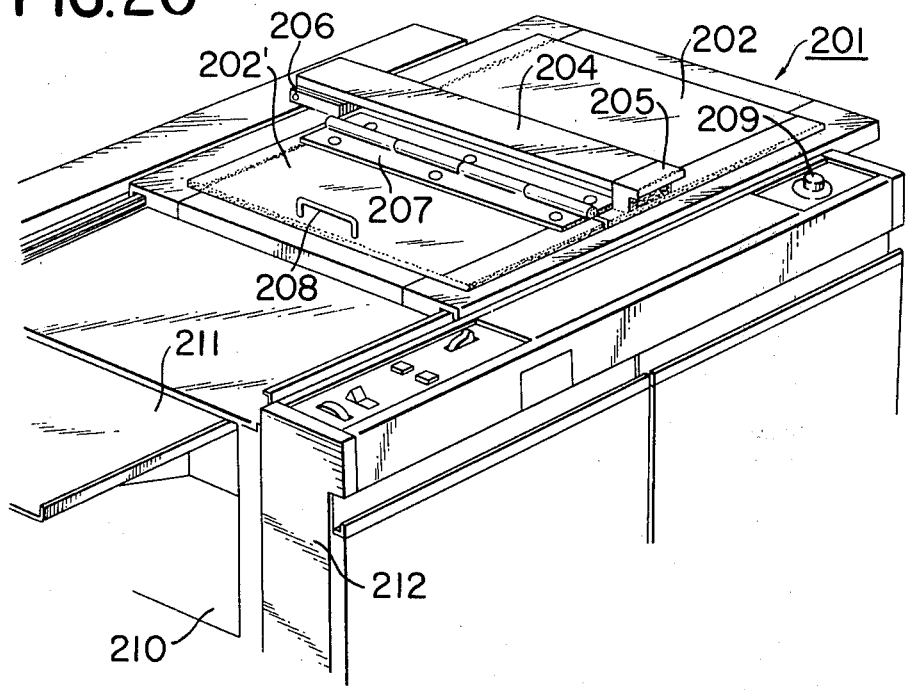
FIG. 20 is a perspective view of the original keep device.
Figure 21A:
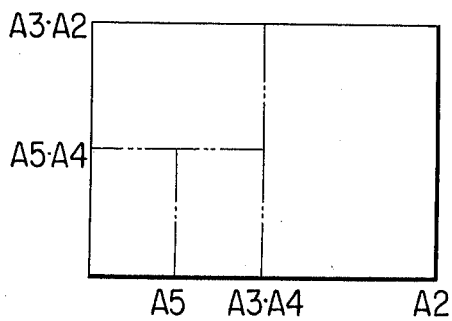
FIGS. 21a and b show the relationships of formats A and B of copy paper.
Figure 21B:
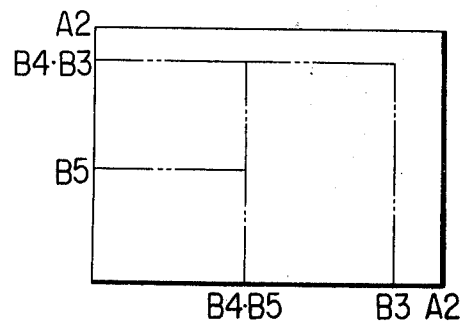

A further embodiment will now be described. FIG. 20 shows a special copying machine which can copy originals of up to size A2 and which, for copying, permits a sheet of original to be inserted through a sheet original inlet port 211 and permits a book or other thick original to be placed on an original carriage. A reciprocally movable original carriage 201 is mounted on top of a machine housing 212, and keep plates 202,202′ of rubber or like material may cover and hold down an original 203 placed on the original carriage 201.

Figure 18:
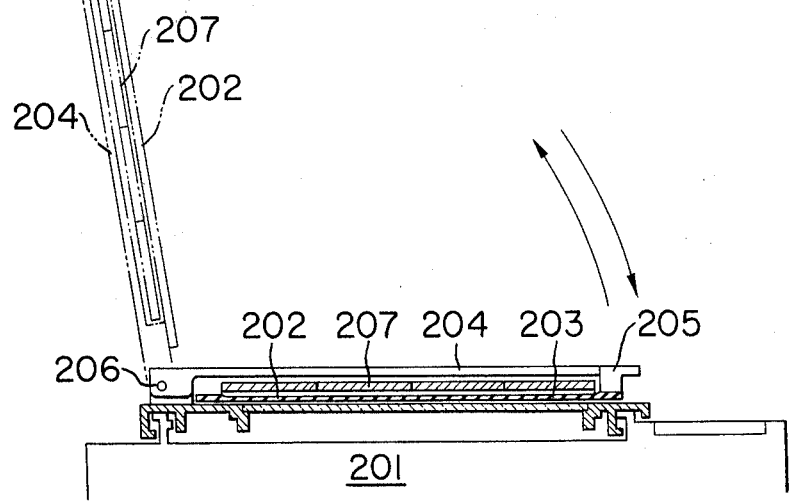
FIG. 18 is a side view, in transverse section, of the keep plate as it is opened and shut in its entirety.
Figure 19:
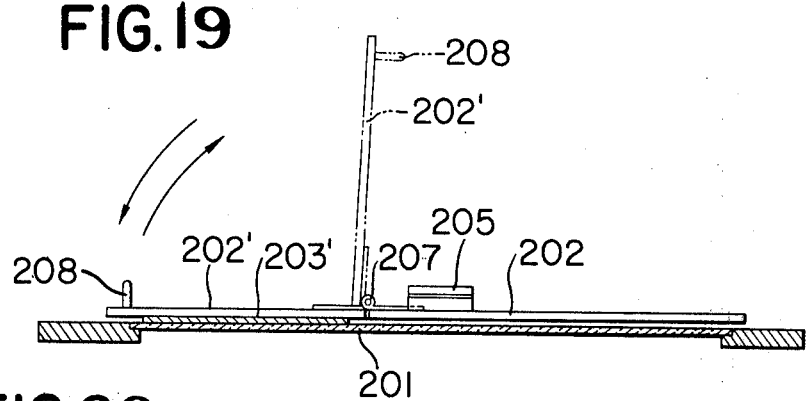
FIG. 19 is a front view, in longitudinal section, of the keep plate as it is partly opened and shut.

The keep plates 202,202′ are mounted on a support member 204 therefor, and may be opened and shut about a shaft 206 in the direction of arrows in FIG. 18, with respect to the original carriage, by manually gripping a handle 205. The keep plates are separately constructed and connected together by a hinge 207. The keep plate 202′ may be opened and shut about the hinge 207 in the directions of arrows in FIG. 19, by gripping a handle 208, and the size thereof is selected such that originals of size A3, i.e. one half of the maximum copy size A2 of the copying machine, and lesser sizes may be set in the area of the keep plate 202′.

To copy an original of size A2 or B3, the handle 205 may be gripped to open the whole of the keep plates 202,202′ about the shaft 206, an original 203 may be placed on the original carriage 201, the keep plates may be entirely shut, and then a copy button 209 may be depressed, whereby the original carriage 201 will automatically reciprocate and a copy will be discharged onto a tray 210.

To copy an original of size A3 or lesser size, only the keep plate 202′ may be opened by gripping the handle 208 with the keep plate 202 maintained in shut position (see FIG. 19), an original 203′ may be placed on the carriage 201, the keep plate 202′ may be shut, and then the copy button 209 may be depressed, whereby the original carriage 201 will automatically reciprocate and a copy will be discharged onto the tray 210.

We claim as our invention:

1. An original keep device for a copying machine:
an original keep member disposed on an upper portion of the machine;
at least one expansible member;
at least two supporting members pivotably connected to said expansible member;
means connecting one of said supporting members to one end of said original keep member to releasably hold said original keep member in an open position above an original in response to a force applied by said expansible member; and
means mounting the other said supporting member for both horizontal and vertical movement to permit the original keep member to exert a substantially uniform pressure on both sheet and thick originals.

2. An original keep device according to claim 1, wherein said expansible member is a spring.

3. An original keep device according to claim 1, further comprising means for resiliently mounting the other end of said original keep member to a body portion of said machine.

4. An original keep device according to claim 1, further comprising stopper means for limiting movement of said original keep member in both the horizontal and vertical directions.

5. An original keep device according to claim 1, wherein a slotted member is mounted on a body portion of the machine, and the other said supporting member is provided with a guide held in said slotted member to limit movement of said other supporting member.

6. An original keep device according to claim 1, further comprising a third supporting member having one end slidably connected to said one supporting member, wherein said one end of said third supporting member is slidable on said one supporting member in accordance with opening or closing movement of said original keep member.

7. An original keep device according to claim 6, wherein said one end of said third supporting member is slidably movable in response to a force applied by said expansible member.

8. An original keep device, for a copying machine having a support surface on which an original is placed for copying, comprising:
   an original keep plate for engaging an original to keep it on the support surface, said original keep plate including a main portion and an auxiliary portion pivotally connected to said main portion; and
   means for movably mounting said main keep plate portion on a body portion of the machine, wherein said mounting means for said main keep plate portion enables said main and auxiliary portions to be moved as a unit for permitting a large original to be placed on the support surface for engagement by both said keep plate portions, and wherein said pivotal mounting of said auxiliary keep plate portion enables said auxiliary portion to be selectively movable independently of the main portion to permit a smaller original to be placed on the original support surface for engagement by only said auxiliary keep plate portion.

* * * * *